(12) United States Patent
Grimm et al.

(10) Patent No.: US 12,209,876 B2
(45) Date of Patent: Jan. 28, 2025

(54) LANE-AWARE NAVIGATION ROUTING FOR A VEHICLE

(71) Applicant: GM Global Technology Operations LLC, Detroit, MI (US)

(72) Inventors: Donald K. Grimm, Utica, MI (US); Chuan Li, Troy, MI (US); Talus Park, Dexter, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 208 days.

(21) Appl. No.: 18/061,073

(22) Filed: Dec. 2, 2022

(65) Prior Publication Data

US 2024/0183672 A1   Jun. 6, 2024

(51) Int. Cl.
  *G01C 21/34* (2006.01)
  *G01C 21/30* (2006.01)

(52) U.S. Cl.
  CPC ......... *G01C 21/3461* (2013.01); *G01C 21/30* (2013.01)

(58) Field of Classification Search
  CPC . G01C 21/3461; G01C 21/30; G01C 21/3453
  See application file for complete search history.

(56) References Cited

U.S. PATENT DOCUMENTS 10,331,141 B2   6/2019 Grimm et al.
2020/0191589 A1 *  6/2020 Tamai ................ G01C 21/3484
2023/0204378 A1 *  6/2023 Fowe .................... G08G 1/0129
                                                  701/450
2023/0249711 A1 *  8/2023 Hardy ............. B60W 30/18145
                                                  701/24

FOREIGN PATENT DOCUMENTS

| CN | 103542859 A | * | 1/2014 | ......... G01C 21/3461 |
| DE | 102009002117 A1 | * | 10/2010 | ......... G01C 21/3461 |
| DE | 102017213932 A1 | * | 2/2019 | |
| GB | 2518857 A | * | 4/2015 | ......... G01C 21/3407 |
| SE | 1550758 A1 | * | 12/2016 | |

OTHER PUBLICATIONS

United States Patent and Trademark Office. U.S. Appl. No. 16/983,505, filed Aug. 3, 2020.

* cited by examiner

*Primary Examiner* — Michael J Zanelli
(74) *Attorney, Agent, or Firm* — Vivacqua Crane, PLLC

(57) ABSTRACT

A system for routing a vehicle based on roadway characteristics includes a global navigation satellite system (GNSS) for determining a geographical location of the vehicle, a vehicle communication system for communicating with at least one external system, and a vehicle controller in electrical communication with the GNSS and the vehicle communication system. The vehicle controller is programmed to determine a vehicle length and a vehicle width, receive a navigation request from an occupant of the vehicle, and determine a navigation route using at least the GNSS and the vehicle communication system in response to receiving the navigation request, where the navigation route is based at least in part on the vehicle length and the vehicle width.

16 Claims, 7 Drawing Sheets

LANE-AWARE NAVIGATION ROUTING FOR A VEHICLE

INTRODUCTION

The present disclosure relates to systems and methods for navigation routing for a vehicle.

To increase occupant awareness and convenience, vehicles may be equipped with navigation systems which are configured to provide navigation directions to assist the occupant in navigating to a destination. Navigation systems may use satellite-based radio communication to determine a location of the vehicle and use local or cloud-based maps to determine a route to the destination. When multiple routes are available, the navigation system may consider various factors, for example, route time, route length, traffic congestion, and fuel consumption to select an optimum or preferred route. However, current navigation systems may fail to account for additional factors which may affect occupant experience. Additionally, navigation systems may alert occupants of hazards present along a route, for example, railroad crossings or school zones. However, current navigation systems may fail to alert occupants of additional hazards.

Thus, while current navigation systems and methods achieve their intended purpose, there is a need for a new and improved system and method for navigation routing for a vehicle.

SUMMARY

According to several aspects, a system for routing a vehicle based on roadway characteristics is provided. The system includes a global navigation satellite system (GNSS) for determining a geographical location of the vehicle, a vehicle communication system for communicating with at least one external system, and a vehicle controller in electrical communication with the GNSS and the vehicle communication system. The vehicle controller is programmed to determine a vehicle length and a vehicle width, receive a navigation request from an occupant of the vehicle, and determine a navigation route using at least the GNSS and the vehicle communication system in response to receiving the navigation request, where the navigation route is based at least in part on the vehicle length and the vehicle width.

In another aspect of the present disclosure, to determine the vehicle length and the vehicle width, the vehicle controller is further programmed to retrieve a predetermined length of the vehicle and a predetermined width of the vehicle from a non-transitory memory of the vehicle controller. To determine the vehicle length and the vehicle width, the vehicle controller is further programmed to determine a towing status of the vehicle, where the towing status includes a trailering status and a non-trailering status. To determine the vehicle length and the vehicle width, the vehicle controller is further programmed to prompt the occupant of the vehicle to provide a trailer length and a trailer width in response to determining that the towing status is the trailering status. To determine the vehicle length and the vehicle width, the vehicle controller is further programmed to determine the vehicle length to be the predetermined length of the vehicle and the vehicle width to be the predetermined width of the vehicle in response to determining that the trailering status is the non-trailering status. To determine the vehicle length and the vehicle width, the vehicle controller is further programmed to determine the vehicle length to be a sum of the predetermined length of the vehicle and the trailer length and the vehicle width to be a larger of the predetermined width of the vehicle and the trailer width in response to determining that the trailering status is the trailering status.

In another aspect of the present disclosure, to determine the navigation route, the vehicle controller is further programmed to determine the geographical location of the vehicle using the GNSS. To determine the navigation route, the vehicle controller is further programmed to transmit the geographical location of the vehicle, the navigation request, the vehicle length, and the vehicle width to a server controller using the vehicle communication system. To determine the navigation route, the vehicle controller is further programmed to receive the navigation route from the server controller using the vehicle communication system.

In another aspect of the present disclosure, the server controller is programmed to determine a plurality of possible routes based at least in part on the geographical location of the vehicle, where each of the plurality of possible routes satisfies the navigation request. The server controller is further programmed to determine a route lane comfort score for each of the plurality of possible routes. The server controller is further programmed to select the navigation route from the plurality of possible routes based at least in part on the route lane comfort score for each of the plurality of possible routes.

In another aspect of the present disclosure, to determine the route lane comfort score for each of the plurality of possible routes, the server controller is further programmed to retrieve a lane width and a lane turn radius for each of a plurality of points along the plurality of possible routes from a database, where the database is in electrical communication with the server controller. To determine the route lane comfort score for each of the plurality of possible routes, the server controller is further programmed to determine a point lane comfort score for each of the plurality of points along each of the plurality of possible routes based at least in part on the lane width and lane turn radius for each of the plurality of points and the vehicle length and vehicle width. To determine the route lane comfort score for each of the plurality of possible routes, the server controller is further programmed to determine the route lane comfort score for each of the plurality of possible routes by summing the point lane comfort score for each of the plurality of points along each of the plurality of possible routes.

In another aspect of the present disclosure, the lane width for each of the plurality of points contained in the database is generated by aggregating a plurality of lane width measurements measured by a plurality of vehicles.

In another aspect of the present disclosure, to determine the point lane comfort score for each of the plurality of points, the server controller is further programmed to calculate an estimated lane deviation for each of the plurality of points based at least in part on the lane width, the lane turn radius, the vehicle length, and the vehicle width. To determine the point lane comfort score for each of the plurality of points, the server controller is further programmed to determine the point lane comfort score for each of the plurality of points based at least in part on the estimated lane deviation for each of the plurality of points.

In another aspect of the present disclosure, to calculate the estimated lane deviation for each of the plurality of points, the server controller is further programmed to calculate the estimated lane deviation for each of the plurality of points using an estimated lane deviation model:

$$D = \left(r - \sqrt{r^2 - \left(\frac{L_V}{2}\right)^2}\right) - \frac{W_L - W_V}{2}$$

wherein D is the estimated lane deviation of one of the plurality of points, r is the lane turn radius of one of the plurality of points, $L_V$ is the vehicle length, $W_L$ is the lane width of one of the plurality of points, and $W_V$ is the vehicle width.

In another aspect of the present disclosure, to determine the point lane comfort score for each of the plurality of points, the server controller is further programmed to determine the point lane comfort score for each of the plurality of points using a lookup table, where the lookup table maps each estimated lane deviation to one of a plurality of predetermined point lane comfort scores.

In another aspect of the present disclosure, the system further includes a camera in electrical communication with the vehicle controller. The vehicle controller is further programmed to capture an image of the environment surrounding the vehicle using the camera. The vehicle controller is further programmed to analyze the image of the environment surrounding the vehicle to determine a measured lane deviation. The vehicle controller is further programmed to determine a lane deviation error by comparing the measured lane deviation to the estimated lane deviation. The vehicle controller is further programmed to adjust the plurality of predetermined point lane comfort scores of the lookup table based at least in part on the lane deviation error.

According to several aspects, a method for routing a vehicle based on roadway characteristics is provided. The method also includes aggregating a plurality of lane width measurements of plurality of roadways in a database, where the plurality of lane width measurements is measured by a plurality of vehicles, where each of the plurality of vehicles is equipped with a vehicle sensor for measuring lane widths, and where the plurality of lane width measurements is wirelessly transmitted to the database by the plurality of vehicles. The method also includes determining a navigation route for the vehicle based at least in part on the plurality of lane width measurements in the database, a plurality of lane turn radii, a vehicle width, and a vehicle length.

In another aspect of the present disclosure, determining a navigation route further may include receiving a navigation request from an occupant of the vehicle. Determining a navigation route further may include determining a plurality of possible routes which satisfy the navigation request based at least in part on a location of the vehicle and the navigation request. Determining a navigation route further may include determining a route lane comfort score for each of the plurality of possible routes. Determining a navigation route further may include selecting the navigation route from the plurality of possible routes based at least in part on the route lane comfort score for each of the plurality of possible routes.

In another aspect of the present disclosure, determining the route lane comfort score for each of the plurality of possible routes further may include retrieving a lane width and a lane turn radius for each of a plurality of points along the plurality of possible routes from a database. Determining the route lane comfort score for each of the plurality of possible routes further may include determining a point lane comfort score for each of the plurality of points along each of the plurality of possible routes based at least in part on the lane width and lane turn radius for each of the plurality of points and a vehicle length and a vehicle width. Determining the route lane comfort score for each of the plurality of possible routes further may include determining the route lane comfort score for each of the plurality of possible routes by summing the point lane comfort score for each of the plurality of points along each of the plurality of possible routes.

In another aspect of the present disclosure, determining the point lane comfort score for each of the plurality of points further may include calculating an estimated lane deviation for each of the plurality of points based at least in part on the lane width, the lane turn radius, the vehicle length, and the vehicle width. Determining the point lane comfort score for each of the plurality of points further may include determining the point lane comfort score for each of the plurality of points using a lookup table, where the lookup table maps each estimated lane deviation to one of a plurality of predetermined point lane comfort scores.

In another aspect of the present disclosure, Calculating the estimated lane deviation for each of the plurality of points further may include calculating the estimated lane deviation for each of the plurality of points using an estimated lane deviation model:

$$D = \left(r - \sqrt{r^2 - \left(\frac{L_V}{2}\right)^2}\right) - \frac{W_L - W_V}{2}$$

wherein D is the estimated lane deviation of one of the plurality of points, r is the lane turn radius of one of the plurality of points, $L_V$ is the vehicle length, $W_L$ is the lane width of one of the plurality of points, and $W_V$ is the vehicle width.

In another aspect of the present disclosure, the method further includes capturing an image of an environment surrounding the vehicle using a camera and analyzing the image of the environment surrounding the vehicle to determine a measured lane deviation. The method further includes determining a lane deviation error by comparing the measured lane deviation to the estimated lane deviation and adjusting the plurality of predetermined point lane comfort scores of the lookup table based at least in part on the lane deviation error.

In another aspect of the present disclosure, the method further includes monitoring a location of the vehicle using a global navigation satellite system (GNSS). The method further includes determining a point lane comfort score for a point near the vehicle based at least in part on the location of the vehicle, the vehicle length, the vehicle width, a lane width of a roadway at the point near the vehicle, and a lane turn radius of the roadway at the point near the vehicle. The method further includes comparing the point lane comfort score for the point near the vehicle to a predetermined lane comfort threshold. The method further includes notifying an occupant of the vehicle in response to determining that the point lane comfort score for the point near the vehicle is less than or equal to the predetermined lane comfort threshold.

According to several aspects, a system for routing a vehicle based on roadway characteristics is provided. The system includes a global navigation satellite system (GNSS) for determining a geographical location of the vehicle, at least one vehicle sensor, where the at least one vehicle sensor includes a camera configured to view an environment surrounding the vehicle, a vehicle communication system for communicating with at least one external system, and a vehicle controller in electrical communication with the GNSS, the at least one vehicle sensor, and the vehicle communication system. The vehicle controller is programmed to determine a vehicle length and a vehicle width. The vehicle controller is further programmed to receive a navigation request from an occupant of the vehicle. The vehicle controller is further programmed to determine a navigation route using at least the GNSS and the vehicle communication system in response to receiving the navigation request, where the navigation route is based at least in part on the vehicle length and the vehicle width. The vehicle controller is further programmed to determine roadway characteristics at a plurality of locations.

In another aspect of the present disclosure, to determine the navigation route, the vehicle controller is further programmed to determine the geographical location of the vehicle using the GNSS. To determine the navigation route, the vehicle controller is further programmed to transmit the geographical location of the vehicle, the navigation request, the vehicle length, and the vehicle width to a server controller using the vehicle communication system. The server controller is programmed to determine a plurality of possible routes based at least in part on the geographical location of the vehicle, where each of the plurality of possible routes satisfies the navigation request. The server controller is further programmed to retrieve a lane width and a lane turn radius for each of a plurality of points along the plurality of possible routes from a database, where the database is in electrical communication with the server controller. The server controller is further programmed to calculate an estimated lane deviation for each of the plurality of points using an estimated lane deviation model:

$$D = \left(r - \sqrt{r^2 - \left(\frac{L_V}{2}\right)^2}\right) - \frac{W_L - W_V}{2}$$

wherein D is the estimated lane deviation of one of the plurality of points, r is the lane turn radius of one of the plurality of points, $L_V$ is the vehicle length, $W_V$ is the lane width of one of the plurality of points, and $W_V$ is the vehicle width. The server controller is further programmed to determine a point lane comfort score for each of the plurality of points using a lookup table, where the lookup table maps each estimated lane deviation to one of a plurality of predetermined point lane comfort scores. The server controller is further programmed to determine a route lane comfort score for each of the plurality of possible routes by summing the point lane comfort score for each of the plurality of points along each of the plurality of possible routes. The server controller is further programmed to select the navigation route from the plurality of possible routes based at least in part on the route lane comfort score for each of the plurality of possible routes. The server controller is further programmed to transmit the navigation route to the vehicle communication system using an external communication system, where the external communication system is in electrical communication with the server controller. To determine the navigation route, the vehicle controller is further programmed to receive the navigation route from the server controller using the vehicle communication system.

In another aspect of the present disclosure, to determine at least one roadway characteristic at the plurality of locations the vehicle controller is further programmed to measure a plurality of lane widths at the plurality of locations using the vehicle sensor and transmit the plurality of lane widths measured at the plurality of locations to the database using the vehicle communication system.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

When operating a vehicle, an occupant may encounter road configurations (e.g., narrow roadways, roadways having a small turn radius, and the like), which cause difficultly in traversing the roadway and/or discomfort to the occupant. Using the system and method of the present disclosure, vehicle navigation systems may account for characteristics of the vehicle and road configurations to provide optimized routes to the occupant, increasing occupant experience and comfort.

Figure 1:
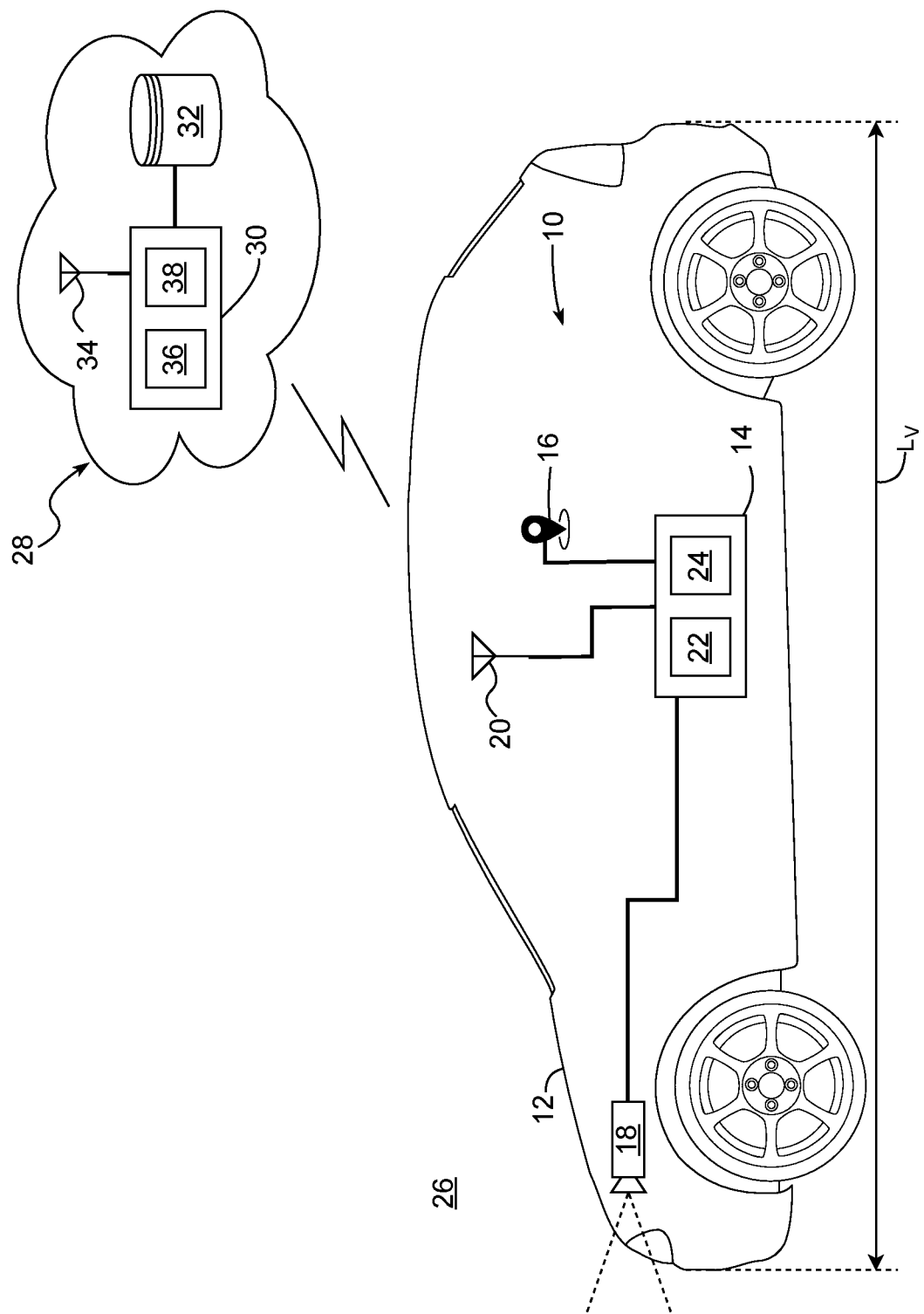
FIG. 1 is a schematic diagram of a system for routing a vehicle based on roadway characteristics according to an exemplary embodiment.

Referring to FIG. 1, a system for routing a vehicle based on roadway characteristics is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a vehicle controller 14, a global navigation satellite system (GNSS) 16, a vehicle sensor 18, and a vehicle communication system 20.

The vehicle controller 14 is used to implement methods 100 and/or 200 for routing a vehicle based on roadway characteristics, as will be described below. The vehicle controller 14 includes at least one processor 22 and a non-transitory computer readable storage device or media 24. The processor 22 may be a custom made or commercially available processor, a central processing unit (CPU), a graphics processing unit (GPU), an auxiliary processor among several processors associated with the vehicle controller 14, a semiconductor-based microprocessor (in the form of a microchip or chip set), a macroprocessor, a combination thereof, or generally a device for executing instructions. The computer readable storage device or media 24 may include volatile and nonvolatile storage in read-only memory (ROM), random-access memory (RAM), and keep-alive memory (KAM), for example. KAM is a persistent or non-volatile memory that may be used to store various operating variables while the processor 22 is powered down. The computer-readable storage device or media 24 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 14 to control various systems of the vehicle 12. The vehicle controller 14 may also consist of multiple controllers which are in electrical communication with each other. The vehicle controller 14 may be interconnected with additional systems and/or controllers of the vehicle 12, allowing the vehicle controller 14 to access data such as, for example, speed, acceleration, braking, and steering angle of the vehicle 12.

The vehicle controller 14 is in electrical communication with the global navigation satellite system (GNSS) 16, the vehicle sensor 18, and the vehicle communication system 20. In an exemplary embodiment, the electrical communication is established using, for example, a CAN bus, a Wi-Fi network, a cellular data network, or the like. It should be understood that various additional wired and wireless techniques and communication protocols for communicating with the vehicle controller 14 are within the scope of the present disclosure.

The GNSS 16 is used to determine a geographical location of the vehicle 12. In an exemplary embodiment, the GNSS 16 is a global positioning system (GPS). In a non-limiting example, the GPS includes a GPS receiver antenna (not shown) and a GPS controller (not shown) in electrical communication with the GPS receiver antenna. The GPS receiver antenna receives signals from a plurality of satellites, and the GPS controller calculates the geographical location of the vehicle 12 based on the signals received by the GPS receiver antenna. In an exemplary embodiment, the GNSS 16 additionally includes a map. The map includes information about infrastructure such as municipality borders, roadways, railways, sidewalks, buildings, and the like. Therefore, the geographical location of the vehicle 12 is contextualized using the map information. In a non-limiting example, the map is retrieved from a remote source using a wireless connection. In another non-limiting example, the map is stored in a database of the GNSS 16. It should be understood that various additional types of satellite-based radionavigation systems, such as, for example, the Global Positioning System (GPS), Galileo, GLONASS, and the BeiDou Navigation Satellite System (BDS) are within the scope of the present disclosure.

The vehicle sensor 18 is used to determine information about the environment 26 surrounding the vehicle 12. In an exemplary embodiment, the vehicle sensor 18 is a photo and/or video camera which is positioned to view the environment 26 in front of the vehicle 12. In another exemplary embodiment, the vehicle sensor 18 is capable of measuring distances in the environment 26 surrounding the vehicle 12. In a non-limiting example wherein the vehicle sensor 18 is a camera, the vehicle sensor 18 measures distances using an image processing algorithm configured to process images from the camera and determine distances between objects. In another non-limiting example, the vehicle sensor 18 is a stereoscopic camera having distance measurement capabilities. In one example, the vehicle sensor 18 is affixed inside of the vehicle 12, for example, in a headliner of the vehicle 12, having a view through a windscreen of the vehicle 12. In another example, the vehicle sensor 18 is affixed outside of the vehicle 12, for example, on a roof of the vehicle 12, having a view of the environment 26 surrounding the vehicle 12. It should be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure. Various additional types of vehicle sensors, such as, for example, LiDAR sensors, ultrasonic ranging sensors, radar sensors, and/or time-of-flight sensors are within the scope of the present disclosure.

The vehicle communication system 20 is used by the vehicle controller 14 to communicate with other systems external to the vehicle 12. For example, the vehicle communication system 20 includes capabilities for communication with other vehicles ("V2V" communication), infrastructure ("V2I" communication), remote systems at a remote call center (e.g., ON-STAR by GENERAL MOTORS) and/or personal devices. In general, the term vehicle-to-everything communication ("V2X" communication) refers to communication between the vehicle 12 and any remote system (e.g., vehicles, infrastructure, and/or remote systems). In certain embodiments, the vehicle communication system 20 is a wireless communication system configured to communicate via a wireless local area network (WLAN) using IEEE 802.11 standards or by using cellular data communication. However, additional or alternate communication methods, such as a dedicated short-range communications (DSRC) channel and/or mobile telecommunications protocols based on the $3^{rd}$ Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations which develop protocols and standards for mobile telecommunications. 3GPP standards are structured as "releases". Thus, communication methods based on 3GPP release 14, 15, 16 and/or future 3GPP releases are considered within the scope of the present disclosure. Accordingly, the vehicle communication system 20 may include one or more antennas and/or communication transceivers for receiving and/or transmitting signals, such as cooperative sensing messages (CSMs). The vehicle communication system 20 is configured to wirelessly communicate information between the vehicle 12 and another vehicle. Further, the vehicle communication system 20 is configured to wirelessly communicate information between the vehicle 12 and infrastructure or other vehicles.

With continued reference to FIG. 1, a server system is illustrated and generally indicated by reference number 28. The server system 28 includes a server controller 30 in electrical communication with a database 32 and a server communication system 34. In a non-limiting example, the server system 28 is located in a server farm, datacenter, or the like, and connected to the internet. The server controller 30 includes at least one server processor 36 and a server non-transitory computer readable storage device or server media 38. The description given above for the vehicle controller 14 also applies to the server controller 30. The description given above for the vehicle communication system 20 also applies to the server communication system 34. The server communication system 34 is used to communicate with external systems, such as, for example, the vehicle controller 14 via the vehicle communication system 20.

Figure 2:
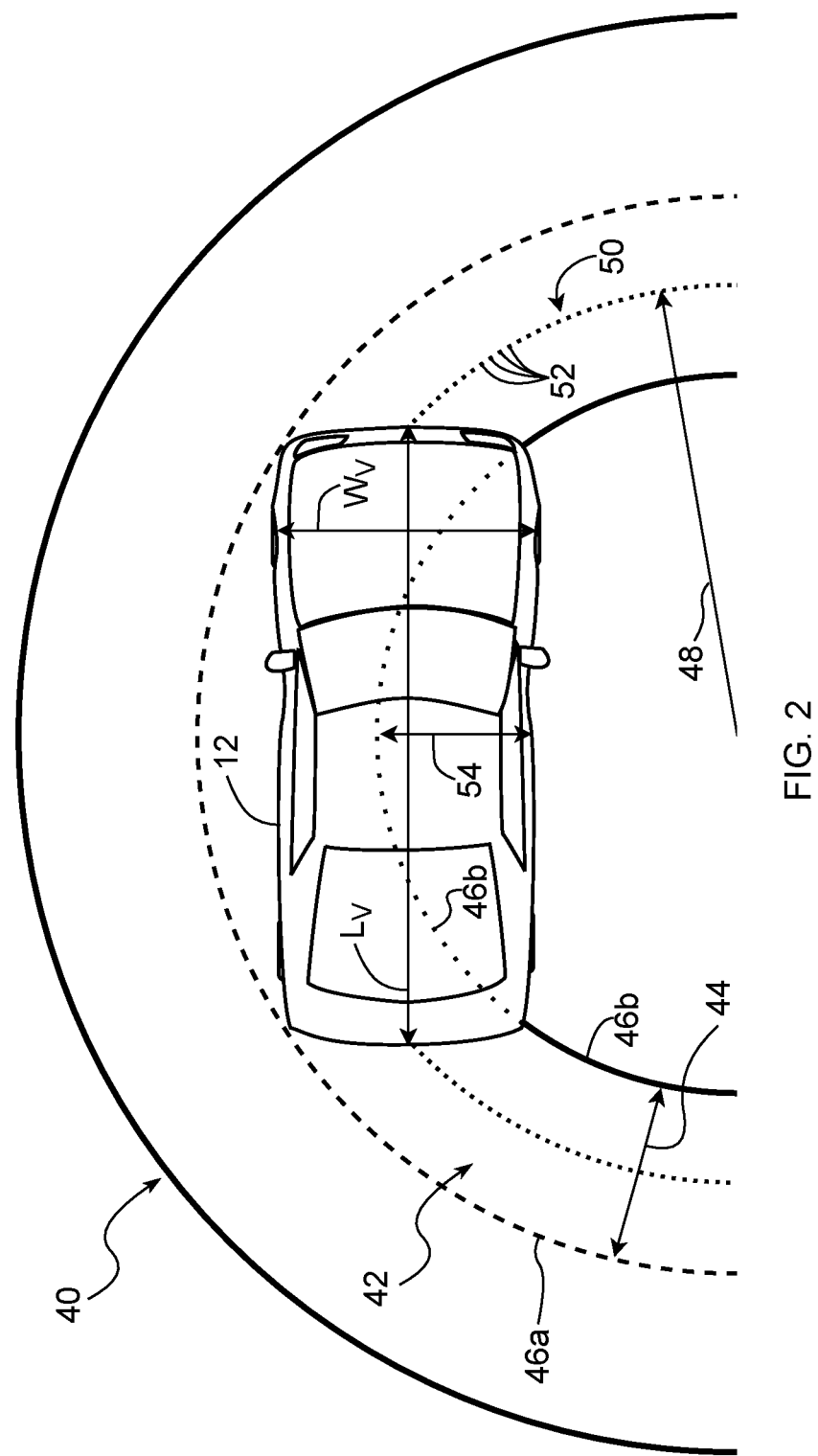
FIG. 2 is a schematic diagram of a vehicle on a roadway according to an exemplary embodiment.

Referring to FIG. 2, a schematic diagram of a vehicle on a roadway is provided. The roadway 40 includes at least one lane 42 having a lane width 44 measured between a first lane marker 46a and a second lane marker 46b. The lane 42 also has a lane turn radius 48 measured to a lane center line 50.

In the exemplary embodiment of FIG. 2, the lane 42 is depicted with a constant lane width 44 and a constant lane turn radius 48. However, it should be understood that lane width 44 and lane turn radius 48 may vary along a length of the roadway 40. Therefore, in a general case, the lane 42 may be understood as being defined by a plurality of points 52, each of the plurality of points 52 having a geographical location along the lane center line 50. At each point 52 along the lane center line 50 the lane 42 has an associated lane width 44 and a lane turn radius 48. Each of the plurality of points 52 is spaced along the length of the roadway 40 at a particular point density (e.g., five meters apart) to provide an approximation of the lane width 44 and lane turn radius 48 along the length of the roadway 40. By adjusting the point density, a resolution of the approximation of the lane width 44 and lane turn radius 48 along the length of the roadway 40 may be adjusted.

When traversing the roadway 40, the vehicle 12 may encounter areas of relatively low lane width 44 and/or relatively small lane turn radius 48 which cause the vehicle 12 to leave the lane 42 (i.e., cross either the first lane marker 46a or second lane marker 46b), causing discomfort for the occupant of the vehicle 12. A distance by which the vehicle 12 crosses either the first lane marker 46a or second lane marker 46b is defined as a lane deviation 54. The lane deviation 54 may be estimated using a mathematical model to determine an estimated lane deviation 54 or measured using the vehicle sensor 18 to determine a measured lane deviation 54, as will be discussed in greater detail below.

Figure 3:
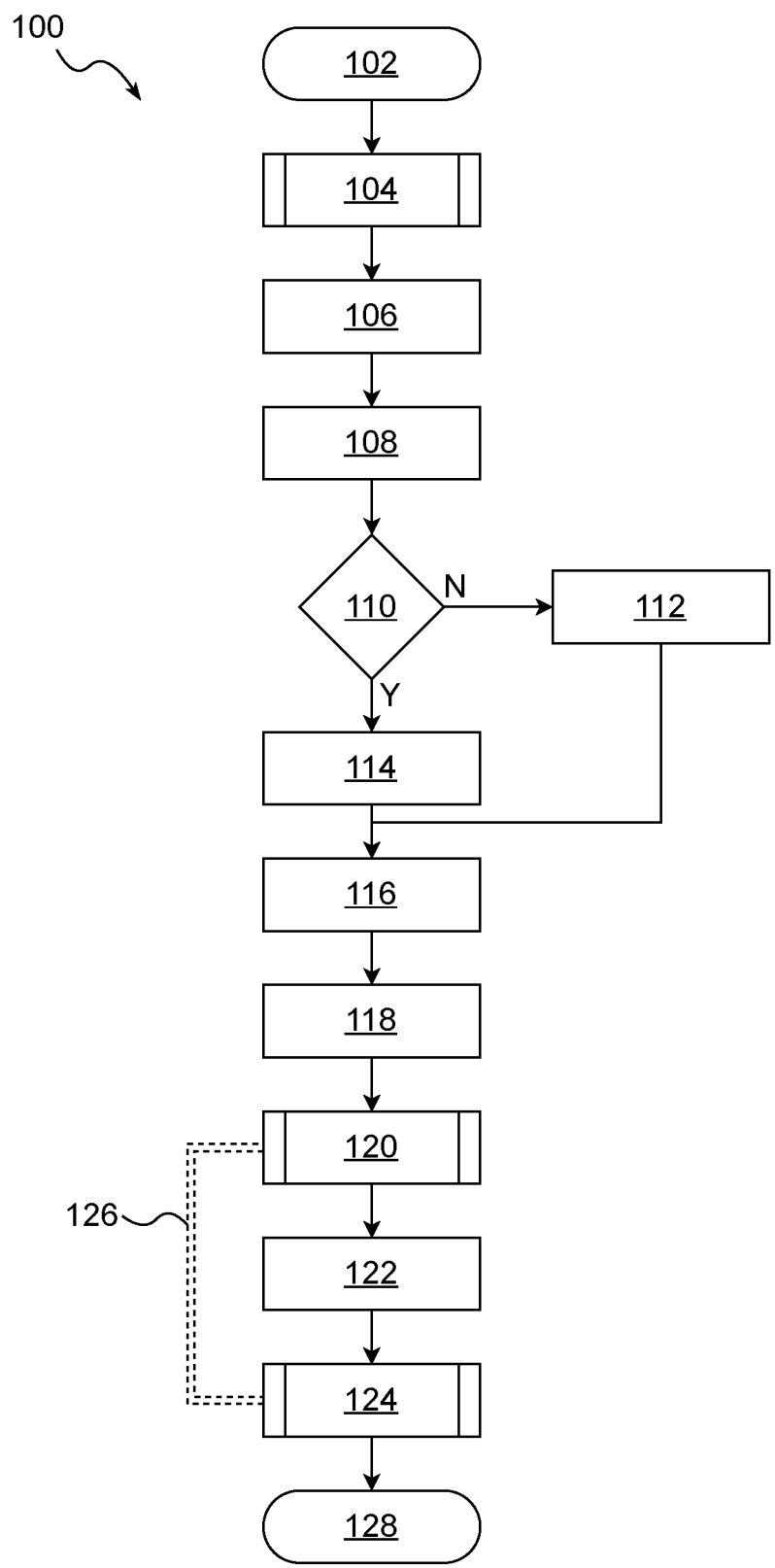
FIG. 3 is a flowchart of a method for routing a vehicle based on roadway characteristics according to a first exemplary embodiment.

Referring to FIG. 3, a flowchart of the method 100 for routing a vehicle based on roadway characteristics is shown. The method 100 begins at block 102 and proceeds to block 104. At block 104, the database 32 (shown in FIG. 1) is populated with a plurality of lane widths (e.g., the lane width 44) of a plurality of roadways (e.g., the roadway 40). Block 104 will be discussed in greater detail in reference to FIG. 4 below. After block 104, the method 100 proceeds to block 106.

At block 106, the vehicle controller 14 receives a navigation request from an occupant of the vehicle 12. In the scope of the present disclosure, the navigation request is a request made by the occupant of the vehicle to use the GNSS 16 to provide navigation directions to a requested destination. In a non-limiting example, the occupant of the vehicle 12 may use a human-machine interface (not shown) of the vehicle 12 to input the requested destination in the form of a street address. After block 106, the method 100 proceeds to block 108.

At block 108, the vehicle controller 14 retrieves a predetermined length of the vehicle 12 and a predetermined width of the vehicle 12 from the media 24 of the vehicle controller 14. In the scope of the present disclosure, the predetermined length and predetermined width are a length and width of the vehicle 12 as originally manufactured, without any additional modifications and/or attachments (e.g., a trailer, bike rack, cargo rack, and/or the like). After block 108, the method 100 proceeds to block 110.

At block 110, the vehicle controller 14 determines a towing status of the vehicle 12. In the scope of the present disclosure, the towing status the vehicle 12 defines whether a trailer is currently connected to the vehicle 12. If a trailer is currently connected to the vehicle 12, the towing status is a trailering status. If a trailer is not currently connected to the vehicle 12, the towing status is a non-trailering status. In an exemplary embodiment, to determine the towing status of the vehicle 12, the vehicle controller 14 determines whether an electrical connection is present between the vehicle 12 and a trailer. In another exemplary embodiment, the vehicle controller 14 uses the human-machine interface (not shown) to prompt the occupant for the towing status of the vehicle 12. If no trailer is currently connected to the vehicle 12 (i.e., the non-trailering status), the method 100 proceeds to block 112. If a trailer is currently connected to the vehicle 12 (i.e., the trailering status), the method 100 proceeds to block 114.

At block 112, a vehicle length is determined to be equal to the predetermined length of the vehicle 12 retrieved at block 108. A vehicle width is determined to be equal to the predetermined width of the vehicle 12 retrieved at block 108. In the scope of the present disclosure, the vehicle height is a height of the vehicle 12 and/or the height of any attachment (e.g., a trailer, bike rack, cargo rack, and/or the like) connected to the vehicle 12. The vehicle width is a width of the vehicle 12 and/or the width of any attachment (e.g., a trailer, bike rack, cargo rack, and/or the like) connected to the vehicle 12. After block 112, the method 100 proceeds to block 116.

At block 114, the vehicle controller 14 requests a trailer length and a trailer width of the trailer which is currently connected to the vehicle 12 from the occupant of the vehicle 12. In an exemplary embodiment, the vehicle controller 14 uses the human-machine interface (not shown) of the vehicle 12 to display a prompt to the occupant of the vehicle 12 requesting the trailer length and trailer width. The vehicle length is determined to be a sum of the predetermined length of the vehicle retrieved at block 108 and the trailer length. If the trailer width is greater than or equal to the predetermined width of the vehicle retrieved at block 108, the vehicle width is determined to be equal to the trailer width. If the trailer width is less than the predetermined width of the vehicle retrieved at block 108, the vehicle width is determined to be equal to the predetermined width of the vehicle retrieved at block 108. After block 114, the method 100 proceeds to block 116.

At block 116, the vehicle controller 14 determines a geographical location of the vehicle 12 using the GNSS 16. After block 116, the method 100 proceeds to block 118.

At block 118, the vehicle controller 14 transmits the navigation request received at block 106, the vehicle length and vehicle width determined at block 112 or 114, and the geographical location of the vehicle 12 determined at block 116 to the server system 28 (shown in FIG. 1) using the vehicle communication system 20. After block 118, the method 100 proceeds to block 120.

At block 120, the server system 28 selects a navigation route. Block 120 will be discussed in greater detail below in reference to FIG. 5. After block 120, the method 100 proceeds to block 122.

At block 122, the vehicle controller 14 receives the navigation route selected by the server system at block 120 from the server system 28 using the vehicle communication system 20. After block 122, the method 100 proceeds to block 124.

At block 124, the vehicle controller 14 receives feedback using the vehicle sensor 18 and transmits the feedback to the server system 28. The double dotted line 126 indicates the feedback being sent to the server system 28 and thus influencing the operation of block 120. Block 124 will be discussed in greater detail below in reference to FIG. 6. After block 124, the method 100 proceeds to enter a standby state at block 128.

In an exemplary embodiment, the vehicle controller 14 repeatedly exits the standby state 128 and restarts the method 100 at block 102. In a non-limiting example, the vehicle controller 14 exits the standby state 128 and restarts the method 100 on a timer, for example, every three hundred milliseconds.

Figure 4:
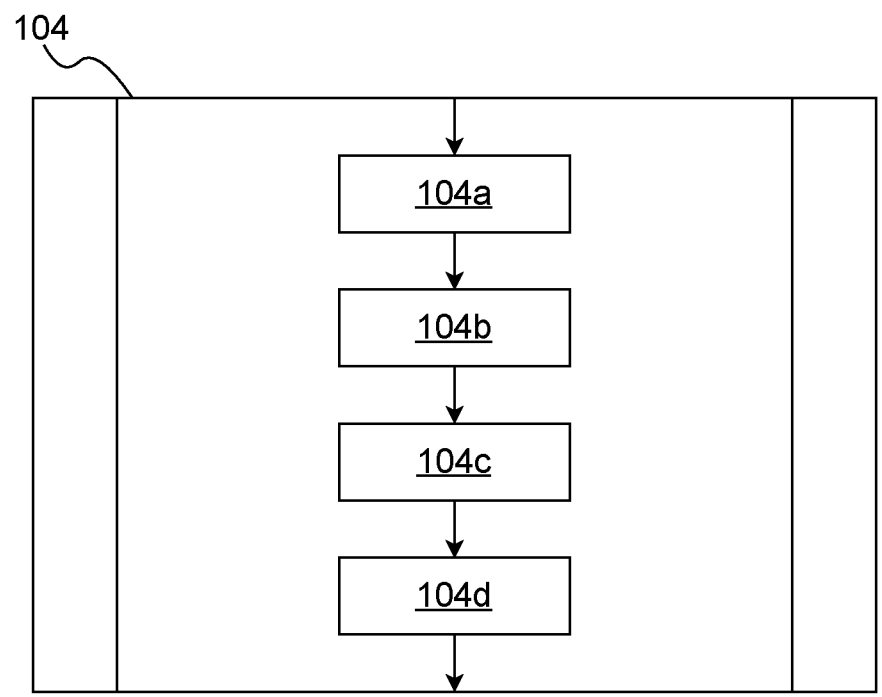
FIG. 4 is a flowchart of a method for populating a database according to an exemplary embodiment.

Referring to FIG. 4, a flowchart of an exemplary embodiment of the block 104 discussed above is provided. The exemplary embodiment of block 104 begins at block 104a. At block 104a, a plurality of vehicles measures a plurality of lane width measurements (e.g., the lane width 44) at each of the plurality of points 52 of a plurality of roadways (e.g., the roadway 40) and transmits the plurality of lane width measurements to the server system 28. In an exemplary embodiment, each of the plurality of vehicles is equipped with a sensor (e.g., the vehicle sensor 18) capable of measuring lane widths. Each of the plurality of vehicles is further equipped with a communication system (e.g., the vehicle communication system 20) used to transmit the plurality of lane width measurements at each of the plurality of points 52 to the server system 28 and a GNSS (e.g., the GNSS 16) to determine a geographical location for each of the plurality of lane width measurements. At block 104a, each of the plurality of lane width measurements and corresponding geographical locations is transmitted to the server system 28. After block 104a, the exemplary embodiment of block 104 proceeds to block 104b.

At block 104b, the server system 28 receives the plurality of lane width measurements and corresponding geographical locations transmitted at block 104a using the server communication system 34. After block 104b, the exemplary embodiment of block 104 proceeds to block 104c.

At block 104c, the server controller 30 determines an average lane width for each of the plurality of points 52 by computing an average of all lane widths received for each of the geographical locations of the plurality of points 52. After block 104c, the exemplary embodiment of block 104 proceeds to block 104d.

At block 104d, the average lane width for each of the plurality of points 52 is stored in the database 32. Thus, the database 32 contains a lane width for each of the plurality of points 52 (i.e., geographical locations).

Figure 5:
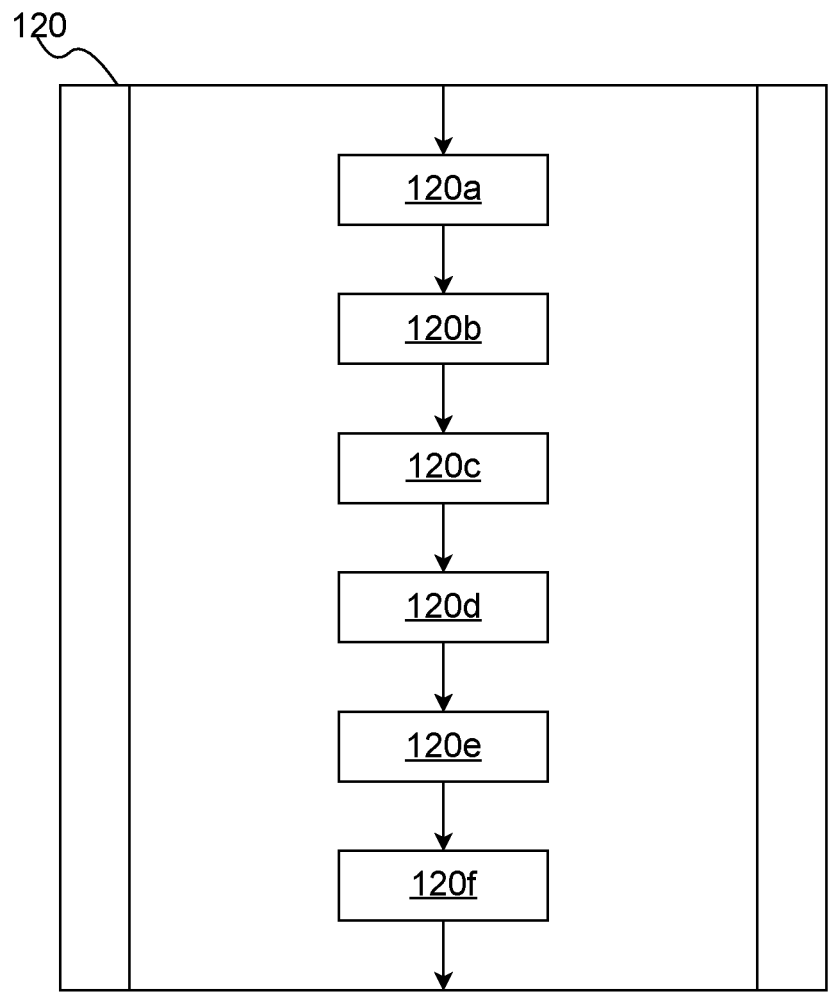
FIG. 5 is a flowchart of a method for selecting a navigation route according to an exemplary embodiment.

Referring to FIG. 5, a flowchart of an exemplary embodiment of the block 120 discussed above is provided. The exemplary embodiment of block 120 begins at block 120a. At block 120a, the server controller 30 determines a plurality of possible routes to satisfy the navigation request received at block 106 based at least in part on the geographical location of the vehicle 12 as determined at block 116. In an exemplary embodiment, the plurality of possible routes is determined based on a map contained in the server media 38 or otherwise accessible by the server controller 30 (e.g., accessible using the server communication system 34). The map includes information about infrastructure such as municipality borders, roadways, railways, sidewalks, buildings, and the like. In an exemplary embodiment, the map also includes the lane turn radius 48 for each of the plurality of points 52. In a non-limiting example, the map is used, along with the geographical location of the vehicle and the navigation request, to generate a plurality of possible routes to satisfy the navigation request. After block 120a, the exemplary embodiment of block 120 proceeds to block 120b.

At block 120b, the server controller 30 retrieves a lane width 44 and a lane turn radius 48 for each of the plurality of points 52 along each of the plurality of possible routes from the database 32. The lane width 44 of each of the plurality of points 52 is saved in the database 32 as discussed above in reference to block 104. In an exemplary embodiment, the lane turn radius 48 of each of the plurality of points 52 is included in the map accessible by the server controller 30 as discussed above in reference to block 120a. After block 120b, the exemplary embodiment of block 120 proceeds to block 120c.

At block 120c, the server controller 30 calculates the estimated lane deviation 54 for the vehicle 12 for each of the plurality of points 52 of each of the plurality of possible routes based at least in part on the lane width 44 and the lane turn radius 48 for each of the plurality of points of each of the plurality of possible routes. In an exemplary embodiment, the estimated lane deviation 54 is calculated using an estimated lane deviation model:

$$D = \left(r - \sqrt{r^2 - \left(\frac{L_V}{2}\right)^2}\right) - \frac{W_L - W_V}{2}$$

wherein D is the estimated lane deviation of one of the plurality of points 52, r is the lane turn radius 48 of one of the plurality of points 52, $L_V$ is the vehicle length, $W_L$ is the lane width 44 of one of the plurality of points 52, and $W_V$ is the vehicle width. After block 120c, the exemplary embodiment of block 120 proceeds to block 120d.

At block 120d, the server controller 30 determines a point lane comfort score for each of the plurality of points 52 of each of the plurality of possible routes based at least in part on the lane width 44 and the lane turn radius 48 for each of the plurality of points of each of the plurality of possible routes. In the scope of the present disclosure, the point lane comfort score quantifies how comfortable an occupant is with driving the vehicle 12 across one of the plurality of points 52 based on the estimated lane deviation of the vehicle 12 at the one of the plurality of points 52. In an exemplary embodiment, the point lane comfort score is determined using the estimated lane deviation 54 calculated at block 120c and a lookup table stored in the server media 38 or otherwise accessible by the server controller 30 (e.g., accessible using the server communication system 34). The lookup table maps each estimated lane deviation 54 to one of a plurality of predetermined point lane comfort scores. In a non-limiting example, a point with an estimated lane deviation 54 of less than zero meters is determined to have a point lane comfort score of 1, a point with an estimated lane deviation 54 of greater than zero and less than one meter is determined to have a point lane comfort score of 1.25, a point with an estimated lane deviation 54 of greater than one and less than three meters is determined to have a point lane comfort score of 1.5, and a point with an estimated lane deviation 54 of greater than three meters is determined to have a point lane comfort score of 10. In a further exemplary embodiment, a mathematical equation is used to relate the estimated lane deviation 54 to the point lane comfort score. It should be understood that the relationship between the estimated lane deviation 54 and the point lane comfort score may be described using a variety of mathematical functions, including, for example, a linear relation, an exponential relation, a logarithmic relation, a radical relation, and/or the like. After block 120*d*, the exemplary embodiment of block 120 proceeds to block 120*e*.

At block 120*e*, the server controller 30 determines a route lane comfort score of each of the plurality of possible routes. In the scope of the present disclosure, the route lane comfort score quantifies how comfortable an occupant is with driving the vehicle 12 along a route based on the point lane comfort score of the plurality of points along the route. In an exemplary embodiment, the route lane comfort score of each of the plurality of possible routes is determined by summing the point lane comfort score for each of the plurality of points along each of the plurality of possible routes. Thus, a route lane comfort score of a given route is a sum of all point lane comfort scores for all points located along the given route. After block 120*e*, the exemplary embodiment of block 120 proceeds to block 120*f*.

At block 120*f*, the server controller 30 selects a navigation route from the plurality of possible routes based at least in part on the route lane comfort score for each of the plurality of possible routes determined at block 120*e* and transmits the navigation route to the vehicle controller 14 using the server communication system 34. In the scope of the present disclosure, the navigation route is one of the plurality of routes which is selected as an optimal route to be presented to the occupant of the vehicle 12 to accommodate the navigation request received at block 106. It should be understood that various factors in addition to the route lane comfort score may be used to select the navigation route, for example, traffic conditions, lane edge condition (i.e., condition of lane markings or road shoulder), obstacle heights (i.e., height of obstacles in relation to a vehicle height), road grade, propulsion stress (i.e., actual or occupant perceived stress to an engine or electric motor of the vehicle 12), and turn complexity (e.g., high turning angle, complex intersection geometry, and the like) along each of the plurality of possible routes.

Figure 6:
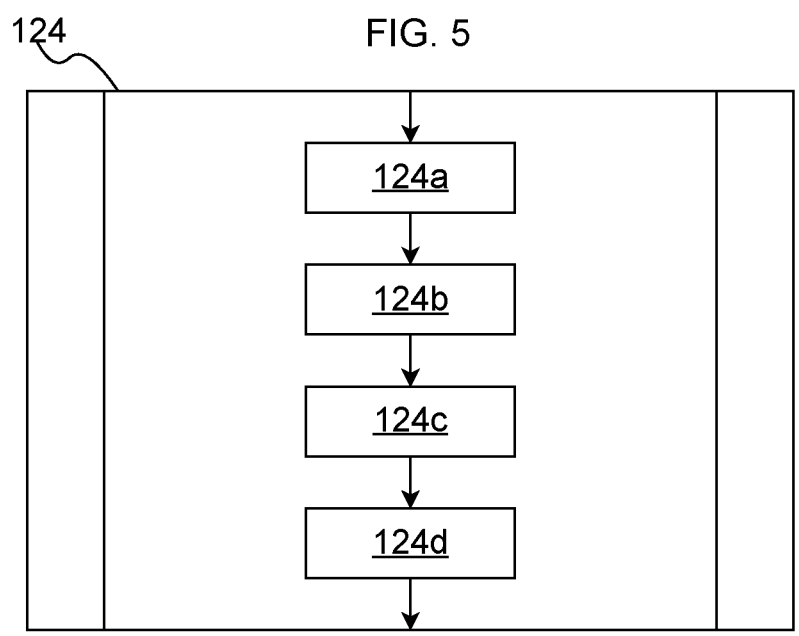
FIG. 6 is a flowchart of a method for receiving feedback according to an exemplary embodiment.

Referring to FIG. 6, a flowchart of an exemplary embodiment of the block 124 discussed above is provided. The exemplary embodiment of block 124 begins at block 124*a*. At block 124*a*, the vehicle controller 14 uses the vehicle sensor 18 (e.g., a camera) to capture an image of the environment 26 surrounding the vehicle 12. In an exemplary embodiment, the image includes a side of the vehicle 12 and at least one of the first lane marker 46*a* and the second lane marker 46*b*. After block 124*a*, the exemplary embodiment of block 124 proceeds to block 124*b*.

At block 124*b*, the image captured at block 124*a* is analyzed to determine the measured lane deviation 54 based on measurement by the vehicle sensor 18. After block 124*b*, the exemplary embodiment of block 124 proceeds to block 124*c*.

At block 124*c*, a lane deviation error is determined by comparing the measured lane deviation 54 to the estimated lane deviation 54 for one of the plurality of points 52. In an exemplary embodiment, the measured lane deviation 54 is subtracted from the estimated lane deviation 54 to determine the lane deviation error. After block 124*c*, the exemplary embodiment of block 124 proceeds to block 124*d*.

At block 124*d*, the plurality of predetermined point lane comfort scores of the lookup table discussed above in reference to block 120*d* are adjusted based on the lane deviation error. For example, if the lane deviation error indicates that the lane deviation has been overestimated, the plurality of predetermined point lane comfort scores of the lookup table are lowered to account for the lane deviation error.

Figure 7:
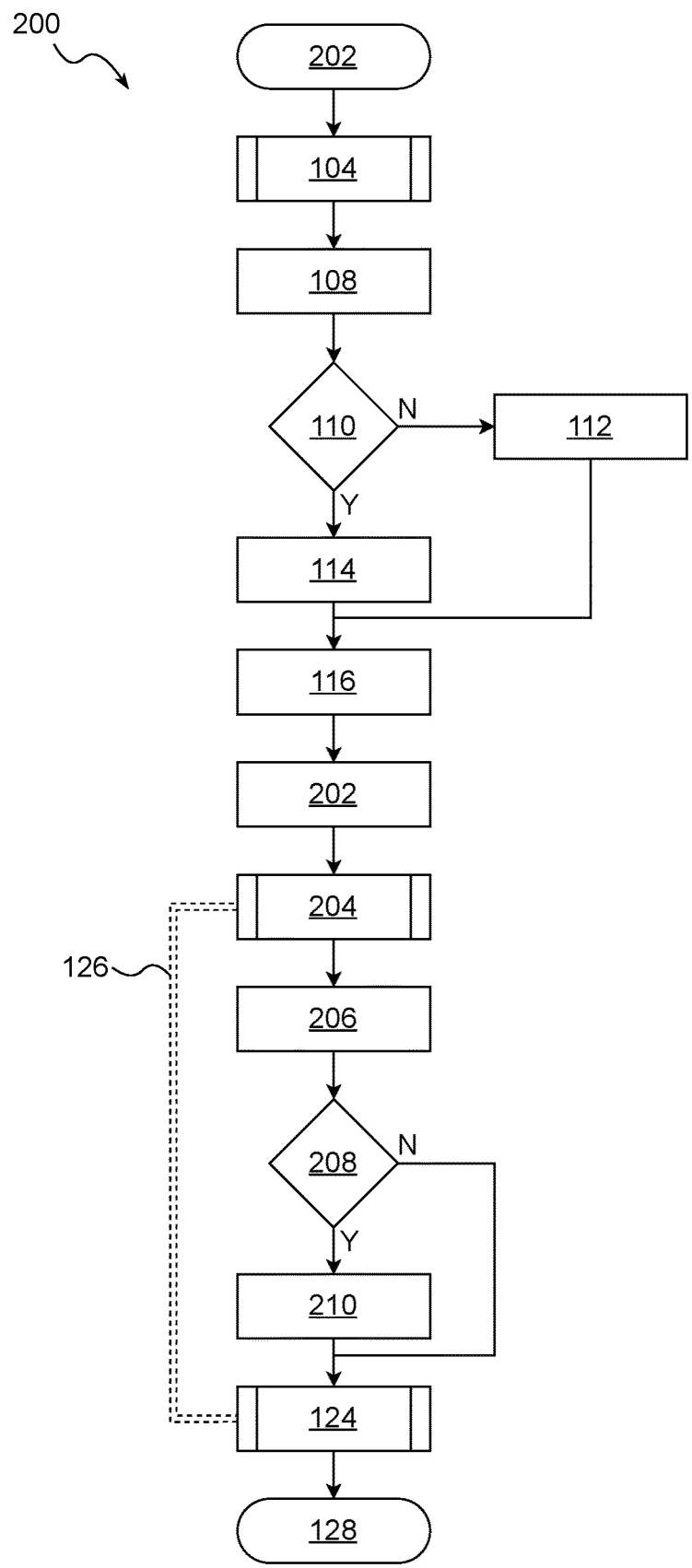
FIG. 7 is a flowchart of a method for routing a vehicle based on roadway characteristics according to a second exemplary embodiment.

Referring to FIG. 7, a flowchart of method 200 for routing a vehicle based on roadway characteristics is shown. The method 200 is an additional embodiment of a method for routing a vehicle based on roadway characteristics. The method 200 shares similarities with the method 100. Thus, like blocks are denoted with like reference numbers, and the descriptions in reference to FIG. 3 above apply to like-numbered blocks of the method 200. The method 200 begins at block 202 and proceeds to block 104 as described above in reference to FIG. 3. After block 104, the method 200 proceeds to block 108 as described above in reference to FIG. 3. After block 108, the method 200 proceeds to block 110 as described above in reference to FIG. 3. After block 110, the method 200 proceeds to block 112 or block 114 as described above in reference to FIG. 3. After block 112 or block 114, the method 200 proceeds to block 116 as described above in reference to FIG. 3. After block 116, the method 200 proceeds to block 202.

At block 202, the vehicle controller 14 transmits the vehicle length and vehicle width determined at block 112 or 114 and the geographical location of the vehicle 12 determined at block 116 to the server system 28 (shown in FIG. 1) using the vehicle communication system 20. After block 202, the method 200 proceeds to block 204.

At block 204, the server system 28 determines the point lane comfort score for a point near the vehicle 12. Block 204 will be discussed in greater detail below in reference to FIG. 8. After block 204, the method 200 proceeds to block 206.

At block 206, the vehicle controller 14 receives the point lane comfort score for the point near the vehicle 12 from the server system 28. After block 206, the method 200 proceeds to block 208.

At block 208, the point lane comfort score received at block 206 is compared to a predetermined lane comfort threshold. In the scope of the present disclosure, the point lane comfort score threshold is minimum point lane comfort score at which the occupant is comfortable. In an exemplary embodiment, the point lane comfort score threshold may be adjusted by the occupant using, for example, the human-machine interface (not shown) of the vehicle 12. If the point lane comfort score received at block 206 is less than or equal to the predetermined lane comfort threshold, the method 200 proceeds to block 210. If the point lane comfort score received at block 206 is greater than the predetermined lane comfort threshold, the method 200 bypasses block 210 and proceeds to block 124 as described above in reference to FIG. 3.

At block 210, the vehicle controller 14 uses the human-machine interface (not shown) of the vehicle 12 to notify the occupant of the vehicle 12 that the point lane comfort score for the point near the vehicle 12 is less than or equal to the predetermined lane comfort threshold. It should be understood that various types of human-machine interface including, for example, a dashboard display, a center console display, a head-up display (HUD), and the like are within the scope of the present disclosure. After block 210, the method 200 proceeds to block 124 as described above in reference to FIG. 3. After block 124, the method 200 proceeds to enter a standby state at block 128 as described above in reference to FIG. 3.

As described above in reference to FIG. 3, the method 200 may periodically exit the standby state 128 and restart the method 200 at block 202.

Figure 8:
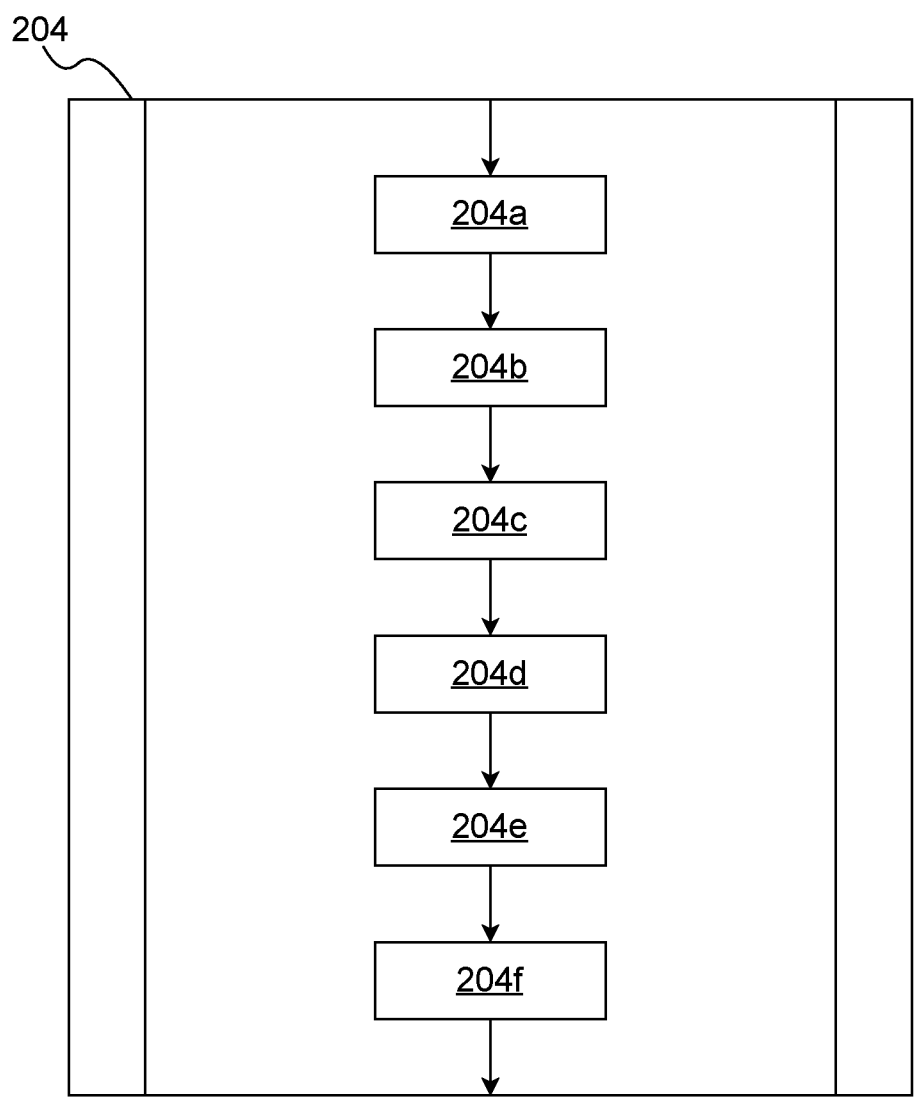
FIG. 8 is a flowchart of a method for determining a point lane comfort score for a point near a vehicle according to a first exemplary embodiment.

Referring to FIG. 8, a flowchart of an exemplary embodiment of the block 204 discussed above is provided. The exemplary embodiment of block 204 begins at block 204*a*. At block 204*a*, the server controller 30 receives the vehicle length, vehicle width and geographical location of the vehicle 12 using the server communication system 34. After block 204*a*, the exemplary embodiment of block 204 proceeds to block 204*b*.

At block 204*b*, the server controller 30 searches the database 32 to identify a point located near the geographical location of the vehicle 12. After block 204*b*, the exemplary embodiment of block 204 proceeds to block 204*c*.

At block 204*c*, the server controller 30 retrieves the lane width 44 of the point located near the geographical location of the vehicle 12 from the database 32 and lane turn radius 48 of the point located near the geographical location of the vehicle 12 from the map accessible by the server controller 30 as described above. After block 204*c*, the exemplary embodiment of block 204 proceeds to block 204*d*.

At block 204*d*, the server controller 30 calculates an estimated lane deviation 54 for the point located near the geographical location of the vehicle 12 based on the vehicle length, vehicle width lane width 44 and lane turn radius 48 as described above in reference to block 120*c*. After block 204*d*, the exemplary embodiment of block 204 proceeds to block 204*e*.

At block 204*e*, the server controller 30 determines a point lane comfort score for the point located near the geographical location of the vehicle 12 based on the estimated lane deviation 54 of the point located near the geographical location of the vehicle 12 as described above in reference to block 120*d*. After block 204*e*, the exemplary embodiment of block 204 proceeds to block 204*f*.

At block 204*f*, the server controller 30 uses the server communication system 34 to transmit the point lane comfort score for the point located near the geographical location of the vehicle 12 determined at block 204*e* to the vehicle controller 14.

The system 10 and methods 100, 200 of the present disclosure offer several advantages. By creating and maintaining the database 32 as described above in reference to block 104, the database 32 may be frequently populated and updated by a plurality of vehicles, leading to increased coverage and accuracy. Additionally, calculating a route lane comfort score for a plurality of routes allows occupant comfort to be increased by selecting a route which is more comfortable for the occupant, using, for example, the method 100. In an additional advantage, the method 200 notifies the occupant of areas of the roadway with low point lane comfort scores, increasing occupant awareness and mitigating opportunities for collision.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for routing a vehicle, the system comprising:
a global navigation satellite system (GNSS) for determining a geographical location of the vehicle;
a vehicle communication system for communicating with at least one external system; and
a vehicle controller in electrical communication with the GNSS and the vehicle communication system, wherein the vehicle controller is programmed to:
determine a vehicle length and a vehicle width;
receive a navigation request from an occupant of the vehicle;
determine the geographical location of the vehicle using the GNSS;
transmit the geographical location of the vehicle, the navigation request, the vehicle length, and the vehicle width to a server controller using the vehicle communication system in response to receiving the navigation request, wherein the server controller is programmed to:
determine a plurality of possible routes based at least in part on the geographical location of the vehicle, wherein each of the plurality of possible routes satisfies the navigation request;
retrieve a lane width and a lane turn radius for each of a plurality of points along the plurality of possible routes from a database, wherein the database is in electrical communication with the server controller;
determine a point lane comfort score for each of the plurality of points along each of the plurality of possible routes based at least in part on the lane width and lane turn radius for each of the plurality of points and the vehicle length and vehicle width; and
determine a route lane comfort score for each of the plurality of possible routes by summing the point lane comfort score for each of the plurality of points along each of the plurality of possible routes; and
select a navigation route from the plurality of possible routes based at least in part on the route lane comfort score for each of the plurality of possible routes; and
receive the navigation route from the server controller using the vehicle communication system.

2. The system of claim 1, wherein to determine the vehicle length and the vehicle width, the vehicle controller is further programmed to:
retrieve a predetermined length of the vehicle and a predetermined width of the vehicle from a non-transitory memory of the vehicle controller;
determine a towing status of the vehicle, wherein the towing status includes a trailering status and a non-trailering status;
prompt the occupant of the vehicle to provide a trailer length and a trailer width in response to determining that the towing status is the trailering status;
determine the vehicle length to be the predetermined length of the vehicle and the vehicle width to be the predetermined width of the vehicle in response to determining that the trailering status is the non-trailering status; and
determine the vehicle length to be a sum of the predetermined length of the vehicle and the trailer length and the vehicle width to be a larger of the predetermined width of the vehicle and the trailer width in response to determining that the trailering status is the trailering status.

3. The system of claim 1, wherein the lane width for each of the plurality of points contained in the database is generated by aggregating a plurality of lane width measurements measured by a plurality of vehicles.

4. The system of claim 1, wherein to determine the point lane comfort score for each of the plurality of points, the server controller is further programmed to:

calculate an estimated lane deviation for each of the plurality of points based at least in part on the lane width, the lane turn radius, the vehicle length, and the vehicle width; and determine the point lane comfort score for each of the plurality of points based at least in part on the estimated lane deviation for each of the plurality of points.

5. The system of claim 4, wherein to calculate the estimated lane deviation for each of the plurality of points, the server controller is further programmed to:

calculate the estimated lane deviation for each of the plurality of points using an estimated lane deviation model:

$$D = \left(r - \sqrt{r^2 - \left(\frac{L_V}{2}\right)^2}\right) - \frac{W_L - W_V}{2}$$

wherein D is the estimated lane deviation of one of the plurality of points, r is the lane turn radius of one of the plurality of points, $L_V$ is the vehicle length, $W_L$ is the lane width of one of the plurality of points, and $W_V$ is the vehicle width.

6. The system of claim 4, wherein to determine the point lane comfort score for each of the plurality of points, the server controller is further programmed to:

determine the point lane comfort score for each of the plurality of points using a lookup table, wherein the lookup table maps each estimated lane deviation to one of a plurality of predetermined point lane comfort scores.

7. The system of claim 6, further including a camera configured to view an environment surrounding the vehicle, wherein the camera is in electrical communication with the vehicle controller, and wherein the vehicle controller is further programmed to:

capture an image of the environment surrounding the vehicle using the camera;

analyze the image of the environment surrounding the vehicle to determine a measured lane deviation;

determine a lane deviation error by comparing the measured lane deviation to the estimated lane deviation; and adjust the plurality of predetermined point lane comfort scores of the lookup table based at least in part on the lane deviation error.

8. A method for routing a vehicle based on roadway characteristics, the method comprising:

aggregating a plurality of lane width measurements of plurality of roadways in a database, wherein the plurality of lane width measurements is measured by a plurality of vehicles, wherein each of the plurality of vehicles is equipped with a vehicle sensor for measuring lane widths, and wherein the plurality of lane width measurements is wirelessly transmitted to the database by the plurality of vehicles; and determining a navigation route for the vehicle based at least in part on the plurality of lane width measurements in the database, a plurality of lane turn radii, a vehicle width, and a vehicle length.

9. The method of claim 8, wherein determining a navigation route further comprises:

receiving a navigation request from an occupant of the vehicle;

determining a plurality of possible routes which satisfy the navigation request based at least in part on a location of the vehicle and the navigation request;

determining a route lane comfort score for each of the plurality of possible routes; and selecting the navigation route from the plurality of possible routes based at least in part on the route lane comfort score for each of the plurality of possible routes.

10. The method of claim 9, wherein determining the route lane comfort score for each of the plurality of possible routes further comprises:

retrieving a lane width and a lane turn radius for each of a plurality of points along the plurality of possible routes from a database;

determining a point lane comfort score for each of the plurality of points along each of the plurality of possible routes based at least in part on the lane width and lane turn radius for each of the plurality of points and a vehicle length and a vehicle width; and determining the route lane comfort score for each of the plurality of possible routes by summing the point lane comfort score for each of the plurality of points along each of the plurality of possible routes.

11. The method of claim 10, wherein determining the point lane comfort score for each of the plurality of points further comprises:

calculating an estimated lane deviation for each of the plurality of points based at least in part on the lane width, the lane turn radius, the vehicle length, and the vehicle width; and determining the point lane comfort score for each of the plurality of points using a lookup table, wherein the lookup table maps each estimated lane deviation to one of a plurality of predetermined point lane comfort scores.

12. The method of claim 11, wherein calculating the estimated lane deviation for each of the plurality of points further comprises:

calculating the estimated lane deviation for each of the plurality of points using an estimated lane deviation model:

$$D = \left(r - \sqrt{r^2 - \left(\frac{L_V}{2}\right)^2}\right) - \frac{W_L - W_V}{2}$$

wherein D is the estimated lane deviation of one of the plurality of points, r is the lane turn radius of one of the plurality of points, $L_V$ is the vehicle length, $W_L$ is the lane width of one of the plurality of points, and $W_V$ is the vehicle width.

13. The method of claim 11, further comprising:

capturing an image of an environment surrounding the vehicle using a camera;

analyzing the image of the environment surrounding the vehicle to determine a measured lane deviation;

determining a lane deviation error by comparing the measured lane deviation to the estimated lane deviation; and adjusting the plurality of predetermined point lane comfort scores of the lookup table based at least in part on the lane deviation error.

14. The method of claim 8, further comprising:

monitoring a location of the vehicle using a global navigation satellite system (GNSS);

determining a point lane comfort score for a point near the vehicle based at least in part on the location of the vehicle, the vehicle length, the vehicle width, a lane width of a roadway at the point near the vehicle, and a lane turn radius of the roadway at the point near the vehicle;

comparing the point lane comfort score for the point near the vehicle to a predetermined lane comfort threshold; and notifying an occupant of the vehicle in response to determining that the point lane comfort score for the point near the vehicle is less than or equal to the predetermined lane comfort threshold.

15. A system for routing a vehicle, the system comprising:
a global navigation satellite system (GNSS) for determining a geographical location of the vehicle;
at least one vehicle sensor, wherein the at least one vehicle sensor includes a camera configured to view an environment surrounding the vehicle;
a vehicle communication system for communicating with at least one external system; and
a vehicle controller in electrical communication with the GNSS, the at least one vehicle sensor, and the vehicle communication system, wherein the vehicle controller is programmed to:
determine a vehicle length and a vehicle width;
receive a navigation request from an occupant of the vehicle;
determine a navigation route using at least the GNSS and the vehicle communication system in response to receiving the navigation request, wherein the navigation route is based at least in part on the vehicle length and the vehicle width, wherein to determine the navigation route, the vehicle controller is further programmed to:
determine the geographical location of the vehicle using the GNSS;
transmit the geographical location of the vehicle, the navigation request, the vehicle length, and the vehicle width to a server controller using the vehicle communication system, wherein the server controller is programmed to:
determine a plurality of possible routes based at least in part on the geographical location of the vehicle, wherein each of the plurality of possible routes satisfies the navigation request;
retrieve a lane width and a lane turn radius for each of a plurality of points along the plurality of possible routes from a database, wherein the database is in electrical communication with the server controller;
calculate an estimated lane deviation for each of the plurality of points using an estimated lane deviation model:

$$D = \left( r - \sqrt{r^2 - \left(\frac{L_V}{2}\right)^2} \right) - \frac{W_L - W_V}{2}$$

wherein D is the estimated lane deviation of one of the plurality of points, r is the lane turn radius of one of the plurality of points, $L_V$ is the vehicle length, $W_L$ is the lane width of one of the plurality of points, and $W_V$ is the vehicle width;
determine a point lane comfort score for each of the plurality of points using a lookup table, wherein the lookup table maps each estimated lane deviation to one of a plurality of predetermined point lane comfort scores;
determine a route lane comfort score for each of the plurality of possible routes by summing the point lane comfort score for each of the plurality of points along each of the plurality of possible routes;
select the navigation route from the plurality of possible routes based at least in part on the route lane comfort score for each of the plurality of possible routes;
transmit the navigation route to the vehicle communication system using an external communication system, wherein the external communication system is in electrical communication with the server controller; and
receive the navigation route from the server controller using the vehicle communication system; and
determine at least one roadway characteristic at a plurality of locations.

16. The system of claim 15, wherein to determine at least one roadway characteristic at the plurality of locations the vehicle controller is further programmed to:
measure a plurality of lane widths at the plurality of locations using the vehicle sensor; and
transmit the plurality of lane widths measured at the plurality of locations to the database using the vehicle communication system.

* * * * *